United States Patent Office 3,168,456
Patented Feb. 2, 1965

3,168,456
POLYMERIC CARBOXYLIC ACIDS BY
IRRADIATION
Clarence Lee Furrow, Bartlesville, Okla., assignor to Phillips Petroleum Company, a corporation of Delaware
No Drawing. Filed Dec. 6, 1960, Ser. No. 73,960
5 Claims. (Cl. 204—154)

This invention relates to the production of a carboxylic acid from an olefin and carbon dioxide. Further, it relates to the production of a thiocarboxylic acid from an olefin and carbon disulfide.

In one of its aspects, the invention relates to a reaction of an olefin, carbon dioxide and/or carbon disulfide in the presence of ionizing radiation. In another of its aspects, the invention relates to a polymeric product which, upon infrared analysis, reveals structure of a carboxylic acid, the product being derived from a 1-olefin and carbon dioxide employing ionizing radiation. In a further aspect, the invention relates to a product which, upon infrared analysis, reveals a structure of a thiocarboxylic acid, the product being derived from a 1-olefin and carbon disulfide, employing ionizing radiation.

Olefins have been reacted with various materials in the presence of free radical generators to produce a variety of products. For example, a number of types of commercial waxes are currently being produced by the reaction of ethylene and carbon monoxide. Other types of polymeric products are produced by telomerization of olefins with such materials, as mercaptans, alcohols and the like.

According to the prior art, ethylene has been reacted with carbon dioxide to produce wax-like substances. This reaction is carried out in the presence of a compound which will generate free radicals, such as the various peroxides. In carrying out this type of reaction, extremely high pressures are required, these pressures being on the order of 100 to 3,000 atmospheres. Furthermore, the reaction temperatures must be sufficient to decompose the free radical generators. It can be easily seen that very costly equipment is required to produce compounds from such a reaction.

It has now been discovered that carboxylic acids can be produced by contacting a mixture of 1-olefins and carbon dioxide in the presence of ionizing radiation. It has further now been discovered that dithiocarboxylic acids can be produced by contacting a mixture of 1-olefins and carbon disulfide in the presence of ionizing radiation.

An object of the present invention is to provide a process for the production of a carboxylic acid from an olefin and carbon dioxide. A further object of the invention is to provide a thiocarboxylic acid from a 1-olefin and carbon disulfide. A still further object of the invention is to provide products derived from a 1-olefin carbon dioxide and/or carbon disulfide. Another object of this invention is to provide long chain carboxylic and long chain dithiocarboxylic acids.

Other aspects, objects, and the several advantages of the invention are apparent from a study of the disclosure and the appended claims.

According to the present invention, a 1-olefin and carbon dioxide are subjected to the action of ionizing radiation at a temperature in the range −60 to 100° C., preferably 0 to 50° C. Further, according to the invention, a mixture of carbon disulfide and a 1-olefin is subjected to the action of ionizing radiation at a temperature within the range −60 to 100° C., preferably 0 to 50° C.

Since the reaction is operative at room temperature, one skilled in the art in possession of this disclosure and having studied the same can routinely determine the optimum temperature. The range given is a preferred range and, since the invention is in the discovery that ionizing radiation will cause the reaction to occur at a relatively low temperature compared with those of the prior art which did not employ ionizing radiation, it will be understood that reaction at a temperature somewhat above 100° C. is within the scope of the broad claims appended to this disclosure.

The weight ratio of carbon dioxide and/or carbon disulfide to olefins in the mixture usually will be within the range between 1:1 and 100:1. The pressure during the reaction should be sufficient to liquefy at least a portion of the carbon dioxide and/or carbon disulfide, and is generally within the range between 500 and 5,000 p.s.i.g. A more preferred range lies between 1,000 and 2,000 p.s.i.g. It is also preferred to agitate the reaction mixture during radiation.

The 1-olefins which can be employed in the process of this invention are those which contain from 2 to 8 carbon atoms. Some examples of suitable 1-olefins which can be employed are Ethylene              n-Octene
Propylene             Isoprene
Isobutylene           Styrene
Butadiene             Vinylcyclohexene The terminology "ionizing radiation" which is employed herein is intended to include Alpha rays            Gamma rays
Beta rays             X-rays Gamma rays are preferred. Any suitable source of radiation can be employed and include cathode tubes, accelerators, natural and artificial radioactive elements, spent fuel elements, and the like.

The mixture of 1-olefins and the carbon dioxide is contacted with rays from one of the above sources at a dose rate of $10^3$ to $10^{10}$ roentgens per hour (rep. units), the total dosage is usually in the range from $10^5$ to $10^{11}$ roentgens, and is more often in the range between $10^6$ and $10^{10}$ roentgens.

At the end of the reaction time, the products are recovered and worked up by any of the well-known conventional methods. For example, moisture and/or reactants can be removed by subjecting the products to vacuum stripping. The products which are recovered are carboxylic acids, and the average molecular weight of the products lies between the range of 100 and 1,000.

As noted herein, I have discovered that I can also use the sulfur analog of carbon dioxide, carbon disulfide. When 1-olefins are reacted with carbon disulfide under the conditions set forth above for carbon dioxide, the products obtained contain dithiocarboxylic acid groups.

The molecular weight of the acids produced by the process of this invention can be regulated by regulating the initial ratio of carbon dioxide and/or carbon disulfide to 1-olefin. Lesser amounts of $CO_2$ and/or $CS_2$ gives higher molecular weight products, and conversely, greater amounts of this compound yield lower molecular weight products.

The following specific examples are intended to illustrate the advantages of the present process, but it is not intended that the process be limited to what is shown in these examples.

EXAMPLE I

Two runs were carried out in which mixtures of carbon dioxide and ethylene were contacted with a beam of gamma rays from a linear accelerator equipped with a tungsten target.

In these runs, the desired amount of $CO_2$ was charged to each bomb as Dry Ice, after which the bomb was closed. The desired amount of ethylene was then pressured into the bomb through a valved inlet tube. Each bomb was then placed in a beam of gamma rays from a linear accelerator equipped with a tungsten target and subjected to gamma irradiation at 65° C. The irradiation time in each run was approximately eight hours. The bombs were then removed from the gamma source and the unreacted $CO_2$ and ethylene were vented from the bombs. The bombs were then opened, and the products were removed from the bombs, and the amount of product from each run was determined. The results of these runs are expressed below as Table I. The molecular weight of the product of Run 1 was determined by the elevation of the boiling point of benzene.

Table I

| Run | Charge, Grams $CO_2$ | Grams $C_2H_4$ | Dose× $10^7$ roentgens | Yield, grams | Mol. Wt. of Product | Product Analysis, Wt. Percent | |
|---|---|---|---|---|---|---|---|
| | | | | | | Carbon | Hydrogen |
| 1 | 146.2 | 21.2 | 1.0 | 1.9 | 574 | 81.6 | 13.4 |
| 2 | 140.0 | 21.7 | 1.0 | 2.6 | Not det. | Not det. | |

All of the products from these runs were white pastes. The product from Run 1 melted at 54–85° C. The product from Run 2 had a solubility of 1.16 weight percent in isooctane at 70° C. and a solubility of less than 0.06 weight percent in N,N-dimethylformamide at 70° C.

A 1.6 gram sample of the product from Run 2 was dissolved in 50 ml. benzene at reflux temperature, after which the solution was cooled to room temperature. This solution was then shaken with 50 ml. of 10 percent by weight aqueous NaOH solution for one minute. A fine emulsion resulted which had not separated after 72 hours. Approximately one-half of the emulsion was then warmed, whereupon a white solid precipitated. This white solid was filtered out, washed and dried. The infrared spectrum of this white solid was characteristic of sodium salts of carboxylic acids. The infrared spectra of the polymers from Runs 1 and 2 showed polyethylene structure by bands at 13.7 and 13.9 microns. Bands at 5.75–5.8 microns showed the presence of carbonyl groups, while the bands at 8–9 microns were characteristic of carboxylic acids. The shape of the band from 3 to 4 microns was also strongly indicative of carboxylic groups.

EXAMPLE II

Another run was carried out in which a mixture of ethylene and carbon dioxide was subjected to the action of gamma rays.

In this run, a bomb was charged with 140 grams of carbon dioxide and 20 grams of ethylene and placed in a field of gamma rays from spent fuel elements from the Materials Testing Reactor at Arco, Idaho. The bomb contents were radiated with gamma rays at a dose rate of $0.776 \times 10^6$ reps./hour until a total dose of $1 \times 10^7$ reps. was obtained. The bomb was then vented and opened and 1.7 grams of solid product was obtained. After vacuum stripping of the product, as in Example I, a carbon-hydrogen analysis was obtained.

Carbon _____ 80.1 weight percent.
Hydrogen _____ 12.0 weight percent.
Oxygen _____ 7.9 weight percent (by difference).

The molecular weight of the product as determined by the elevation of the boiling point of benzene was 568, and the melting range of this product was 72–86° C. The infrared spectrum of the product was very similar to those of the products of Example I.

EXAMPLE III

In another run, the procedure of Example II was repeated except that carbon disulfide was substituted for the carbon dioxide. A small amount of a polymeric material which is estimated to have a molecular weight of from 300 to 500 was obtained. An infrared analysis of this material showed certain peaks which are consistent with the structure of dithiocarboxylic acids.

In still another run, the procedure of Example I was repeated except that isobutylene was substituted for the ethylene. The infrared spectrum of the polymeric product was consistent with that for a carboxylic acid.

EXAMPLE IV

A run was carried out in which ethylene and carbon dioxide were reacted in the presence of a free radical generator.

In this run, 140.3 grams of carbon dioxide, 20.3 grams of ethylene and 1 gram of di-tert-butyl peroxide were charged to a bomb, sealed and heated for 48 hours at 250–260° F. At the end of this time, the bomb was vented and opened and 4.0 grams (after vacuum stripping at 70°/10 mm. for 15 hours to remove peroxide decomposition products) of solid product were recovered.

An infrared spectrum of the production from this run was consistent with polyethylene, and no acid groups appeared in the spectrum.

EXAMPLE V

In still another run, 139.5 grams of carbon dioxide, 20 grams of ethylene and 1.0 gram of azobisisobutyronitrile were charged to a bomb and heated for 4 hours at 177° F. At the end of this time, the bomb was vented and opened, and 1.2 grams of solid product were recovered. This product yield includes approximately 1 gram of the free radical generator decomposition products. As in the production from Example IV, the infrared spectrum was consistent with polyethylene, free radical generator decomposition products, and the presence of acids could not be detected.

Examples I and II above show that the reaction of carbon dioxide with ethylene in the presence of ionizing radiation produces carboxylic acids. Example III shows that carbon disulfide can be substituted for carbon dioxide to produce the corresponding thio products. Example III also shows that 1-olefins other than ethylene can be employed. Examples IV and V are both control runs, and they demonstrate that the products obtained using free radical generators are different from the products obtained when the reaction is carried out under ionizing radiation.

EXAMPLE VI

A series of runs were carried out in which $CO_2$ and ethylene mixtures were irradiated at various temperatures.

In these runs, the designated amounts of reactants were charged to a bomb and subjected to gamma irradiation from a linear accelerator equipped with a tungsten target for eight hours. The total dose in each run was $1 \times 10^7$ reps. The results of these runs are expressed below as Table II.

Table II

| Run No. | Temp., ° C. | Charge, Grams $CO_2$ | Ethylene | Yield, Grams | Oxygen Content, Wt. percent | Product Appearance |
|---|---|---|---|---|---|---|
| 3 | −78 | 140.1 | 20.9 | 0 | | |
| 4 | −40 | 140.1 | 24.2 | 0.1 | Not det. | Tan liquid. |
| 5 | 93 | 142.4 | 19.8 | 7.7 | 3 | Soft paste. |
| 6 | 204 | 140.8 | 21.8 | 13.3 | 0 | Tan liquid. |

Run 6 shows that high temperatures are not applicable, as carboxylic acids are not produced.

The products of this invention can be used in paste and liquid polishes for floors, furniture, shoes, etc., as lubricants, as paper coating agents, and the like. The sodium salts of the carboxylic acids can be employed as emulsifying agents.

Reasonable variation and modification are possible within the scope of the foregoing disclosure and the appended claims to this invention the essence of which is that carboxylic acids and dithiocarboxylic acids are produced from 1-olefins, carbon dioxide and/or carbon disulfide utilizing ionizing radiation, the thio compounds being produced when carbon disulfide is used.

I claim:

1. A process for producing a polymeric carboxylic acid which comprises subjecting a 1-olefin having from 2–8 carbon atoms and at least one material selected from the group consisting of carbon dioxide and carbon disulfide to the action of ionizing radiation at a dose rate in the range $10^3$–$10^{10}$ rep. units per hour up to a total dosage in the range $10^5$–$10^{11}$ roentgens and at a temperature in the approximate range —60 to 100° C., the weight ratio of said selected material to olefin being in the range 1:1–100:1 and the pressure being sufficient to maintain at least a portion of said selected material in liquid phase.

2. A process for producing a polymeric carboxylic acid which comprises subjecting carbon dioxide and a 1-olefin having 2–8 carbon atoms to the action of high energy ionizing radiation at a dose rate in the range $10^3$–$10^{10}$ rep. units per hour up to a total dosage in the range $10^5$–$10^{11}$ roentgens and at a temperature in the approximate range —60 to 100° C., the weight ratio of carbon dioxide to olefin being in the range 1:1–100:1 and the pressure being sufficient to maintain at least a portion of the carbon dioxide in liquid phase.

3. A process according to claim 2 wherein the 1-olefin is selected from the group consisting of

| | |
|---|---|
| Ethylene | n-Octene |
| Propylene | Isoprene |
| Isobutylene | Styrene |
| Butadiene | Vinylcyclohexene |

4. A process for producing a polymeric dithiocarboxylic acid which comprises subjecting carbon disulfide and a 1-olefin having 2–8 carbon atoms to the action of high energy ionizing radiation at a dose rate in the range $10^3$–$10^{10}$ rep. units per hour up to a total dosage in the range $10^5$–$10^{11}$ roentgens and at a temperature in the approximate range —60 to 100° C., the weight ratio of carbon disulfide to olefin being in the range 1:1–100:1 and the pressure being sufficient to maintain at least a portion of the carbon disulfide in liquid phase.

5. A process according to claim 4 wherein the 1-olefin is selected from the group consisting of

| | |
|---|---|
| Ethylene | n-Octene |
| Propylene | Isoprene |
| Isobutylene | Styrene |
| Butadiene | Vinylcyclohexene |

References Cited in the file of this patent

UNITED STATES PATENTS

| | | |
|---|---|---|
| 2,053,233 | Woodhouse | Sept. 1, 1936 |
| 2,352,461 | Walker | June 27, 1944 |
| 2,798,091 | Mavity | July 2, 1957 |
| 2,811,551 | Coffman et al. | Oct. 29, 1957 |
| 2,940,913 | McKusick | June 14, 1960 |
| 2,940,914 | Hoover | June 14, 1960 |

OTHER REFERENCES

Charlesby: "Atomic Radiation and Polymers" (1960), Pergamon Press.